US012779349B2

(12) United States Patent
Tjeng

(10) Patent No.: US 12,779,349 B2
(45) Date of Patent: Nov. 3, 2026

(54) SYSTEMS AND METHODS OF DECENTRALIZED LIVE-STREAMING OF ESPORT GAMES

(71) Applicant: Ka Yie Tjeng, Hong Kong (HK)

(72) Inventor: Ka Yie Tjeng, Hong Kong (HK)

( * ) Notice: Subject to any disclaimer, the term of this patent is extended or adjusted under 35 U.S.C. 154(b) by 175 days.

(21) Appl. No.: 18/382,477

(22) Filed: Oct. 21, 2023

(65) Prior Publication Data

US 2025/0128177 A1 Apr. 24, 2025

(51) Int. Cl.
*A63F 13/86* (2014.01)
*A63F 13/71* (2014.01)

(52) U.S. Cl.
CPC .............. *A63F 13/86* (2014.09); *A63F 13/71* (2014.09); *A63F 2300/577* (2013.01); *A63F 2300/8082* (2013.01)

(58) Field of Classification Search
CPC .... A63F 13/86; A63F 13/71; A63F 2300/577; A63F 2300/8082
See application file for complete search history.

(56) References Cited

U.S. PATENT DOCUMENTS 10,250,649 B2 * 4/2019 Winawer ............. H04L 65/1083
11,443,838 B1 * 9/2022 Cordonnier ............ G16H 10/65
2023/0171238 A1 * 6/2023 Stocker ................. H04L 63/083 726/8
2023/0214462 A1 * 7/2023 Black ...................... H04L 63/08 726/7

* cited by examiner

*Primary Examiner* — Peter J Iannuzzi
(74) *Attorney, Agent, or Firm* — W&P International; Wai P. Leung

(57) ABSTRACT

A metaverse live-streaming system, including an AR computing unit to detect presence of a remote bot application when a web browser is viewed by or in vicinity of a third party spectator, automatically identify the remote bot application from a perspective of the third party spectator, communicably connect to the remote bot application via a personal area network to obtain autograph data for cryptographically signing, display an image, in the perspective of the third party spectator being captured by at least one of a camera and at least one sensor, for detection of presence of the remote bot application in the image, and reject HTTP network traffic incoming from the web browser. A transactional bot server communicates with a plurality of spectator systems to allow a plurality of third party spectators to view at least one of a plurality of players playing the online video game.

10 Claims, 12 Drawing Sheets

SYSTEMS AND METHODS OF DECENTRALIZED LIVE-STREAMING OF ESPORT GAMES

FIELD OF THE INVENTION

One or more aspects of embodiments according to the present disclosure relate to allowing third parties to wager on online multiplayer video games.

BACKGROUND

Esport gaming tournaments have become a big business. Video game tournaments are organized game competitions where single players or teams duke it out for prize money. Some of these tournaments even air on live-streaming platforms that allow gamers and content creators to build communities around their streaming. TWITCH, YOUTUBE, STEAM, etc are some of these platforms that focus on video game live streaming, including broadcasts of esports competitions. Streaming has exploded in popularity—giving millions of viewers and broadcasters a way to interact and share creative content with others. Streamers can "broadcast" their gameplay or activity by sharing their screens with subscribers or fans who can hear and watch them play live.

For KOLs, building an audience through streaming is a promising path to success. KOL stands for Key Opinion Leader which is translated as "influential person". KOLs are followed by many people on media channels or social networks. KOLs want the audience to always remember and look forward to their content production. The KOLs must constantly create and innovate in order to create an engaging stream that pulls the audience in and keeps them coming back for more content. Giveaways in tournaments inside live streams are a great way to interact with viewers and make streams more fun and entertaining. KOL streamers challenge their viewers to fun competitions in the game to help attract more interested people, cause interest for the audience, open up a new channel for net new player acquisition and drive incremental engagement for existing players.

NFTs are tokens linked to digital images, "collectable" items, avatars in games or property and objects in the virtual world of the metaverse. The whole sector is suffering a rout at the moment. The amounts lost to scams have been eye-watering. Axie Infinity, a game played by millions and a key driver of the NFT market, managed to lose more than $500 million in a single swindle. Web3 browser wallets, such as Metamask, are browser plugins or extensions that operate through Web2 browsers and are constantly connected to the internet. Online crypto wallets are more at risk than offline "cold" wallets. Hot wallets can be compromised via security vulnerabilities on a device or internet connection. Cold wallets are not vulnerable to being hacked in the same way as hot wallets. Further, online crypto wallets may not have access to any of a user's information. However, the browser on which a crypto wallet is installed will. Browsers collect telemetry data including browsing and internet usage data.

As the world transitions from Web2 (user generated content and social media) to Web3 (a decentralized internet that puts communities in control) to metaverse, streamers need to give viewers something more than just following a personality while the reputation of the NFTs and cryptocurrencies has been hammered and continue to lose their luster. Followers have grown tired of scams and phishing attacks. What is needed in the art and has heretofore not been available is a system that enables viewers to earn something out of their time spent by enjoying metaverse streaming experience while keeping the browser sandbox safe.

DETAILED DESCRIPTION

Figure 1:
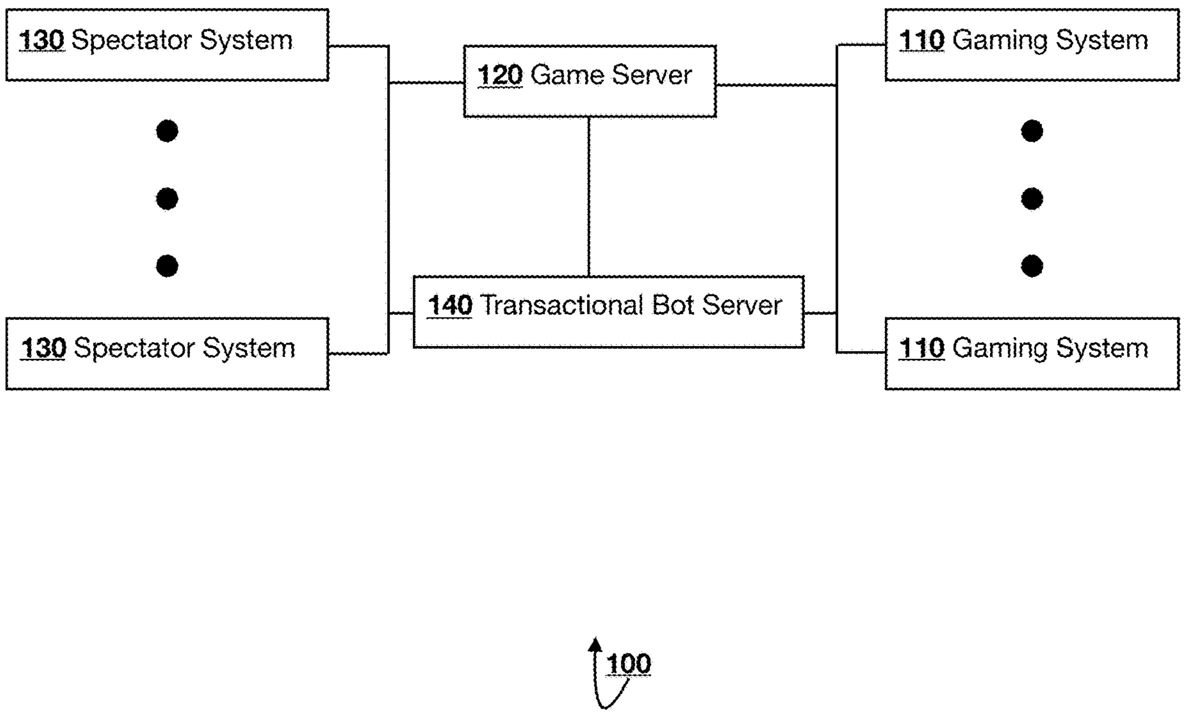
FIG. 1 is a block diagram illustrating a metaverse live-streaming system, according to an exemplary embodiment of the present disclosure.

Referring to FIG. 1, the metaverse live-streaming system 100 may include a plurality of gaming systems 110, a game server 120, a plurality of spectator systems 130, and a transactional bot server 140. Each of the plurality of gaming systems 110, the game server 120, the plurality of spectator systems 130, and the transactional bot server 140 may communicate with each other over any stable communications network, such as, for example, the Internet. The plurality of gaming systems 110 may include a first gaming system $\mathbf{110}_1$, a second gaming system $\mathbf{110}_2$, . . . , and an nth gaming system $\mathbf{110}_n$. There is no limit as to how many gaming systems 110 are included in the metaverse live-streaming system. The plurality of spectator systems 130 may include a first spectator system $\mathbf{130}_1$, a second spectator system $\mathbf{130}_2$, . . . , and an nth spectator system $\mathbf{130}_n$. There is no limit as to how many spectator systems 130 are included in the metaverse live-streaming system 100

Figure 2:
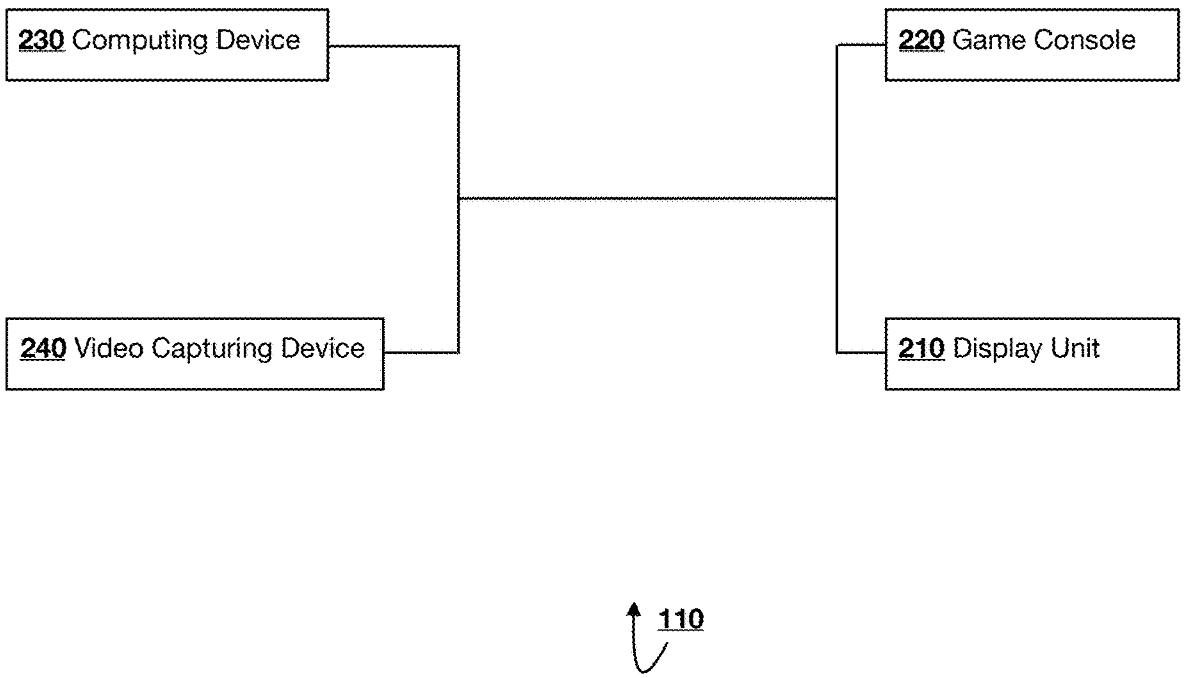
FIG. 2 is a block diagram illustrating a gaming system, according to an exemplary embodiment of the present disclosure.

Referring to FIG. 2, each of the plurality of gaming systems 110 may include same or similar components. Each of the plurality of gaming systems 110 may include a display unit 210, a game console 220, a computing device 230, and a video capturing device 240. The video capturing device 240 may be a capture card or any other type of device that is capable of capturing images from external devices via video signals, typically through HDMI. Alternatively, a user may use an application such as XSPLIT or OBS to live stream game play. As such, images from video game systems such as XBOX, NINTENDO, and PLAYSTATION may be captured to be streamed live in real time. More specifically, the video capturing device 240 may function like an input data receiver. Therefore, if a user is playing a video game on the game console, the video capturing device 240 may continuously receive data from the game console 220, and then transfer the received data to the computing device 230. This signal may be captured, recorded, and encoded as per need by the computing device 230, and may be uploaded or live-streamed from the computing device 230 to websites such as TWITCH.

The computing device 230 may allow a player to access a website and/or application using credentials of the player. More specifically, the player may create a player profile that includes and/or stores a password, a user name, a picture of the player, recording of games the player has played, statistics of wins/losses/ties, and other data to be stored by the website and/or application and/or server. In other words, the computing device 230 may allow the player to use the website and/or the application to register their profiles, and then subsequently to login to the website and/or the application using their respective profiles. As such, the video capturing device 240 may capture live game play action images from the game console 220 that are also displayed on the display unit 210, and may send these captured images to the computing device 230. The images may then be streamed from the computing device 230 in real-time to a website, application, or server to be viewable by third party spectators and/or recorded for future viewing.

The game server 120 may be a server located and controlled by a video game company, such as MICROSOFT, NINTENDO, and/or SONY, but is not limited thereto. More specifically, the game server 120 provides game data to the game console 220, the game data being necessary to operate particular online video games. The game server 120 may also allow various players all around the world to play each other and communicate on different game consoles $\mathbf{220}_1$, $\mathbf{220}_2$, . . . , $\mathbf{220}_n$.

Unless otherwise noted or readily evident from the context as applied herein, the term “Competitor” refers to players participation on a multiplayer gaming network who may also be “Spectator” of a live-streaming system provided in accordance with some embodiments of the present disclosure. The terms “Competitor” and “Spectator” sometimes may be used interchangeably herein.

Since the transactional bot server 140 is communicably connected to the game server 120, players may use the transactional bot server 140 to schedule games and/or create tournaments. Players may also invite other players to play in the games and/or tournaments, and may also invite spectators with profiles to view the games. Players may be motivated to increase their views by receiving incentives from the transactional bot server, such as coupons, money, and/or other incentives.

The tournament/game may proceed under normal game mechanics as provided by the game server 120, until game play completes. The transactional bot server 140 may receive and store completed game statistics from the game server 120, or, alternatively, directly from each of the plurality of gaming systems 110.

The game statistics may indicate winners and losers based on one or more in-game metrics. A player may also determine one or more custom in-game metrics to be used in determining winners and losers during tournament/game initialization. The transactional bot server 140 can send the game statistics to each of the plurality of spectator systems 130, which provides the game statistics to the players.

Figure 3:
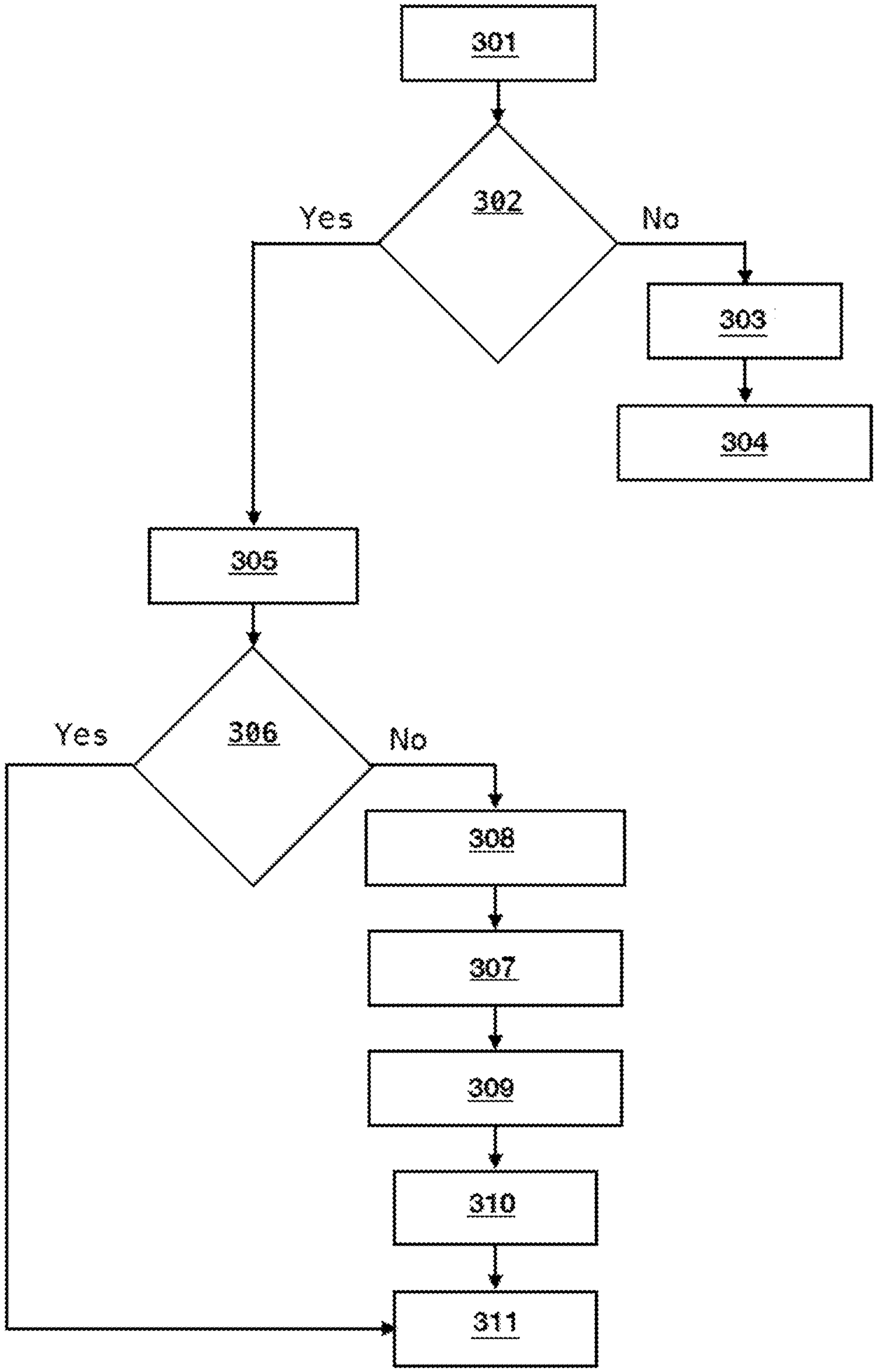
FIG. 3 is a flow chart illustrating a method of hosting a live-streaming game scenario, according to an exemplary embodiment of the present disclosure.

Referring to FIG. 3, the method of hosting live-streaming games includes step 301 of hosting a new live-streaming online video game by one of the plurality of players (aka game host). At step 302, the transactional bot server 140 detects a selection input received from the game host, the selection input indicates game type. At step 303, the transactional bot server 140 determines the input indicates selecting a new game not known to the server. At step 304, the transactional bot server 140 puts the new game on hold for 30 days while pending for approval. At step 305, the transactional bot server 140 determines the input indicating a selection of a game that is known to the transactional bot server 140. At step 306, the transactional bot server 140 detects a selection input received from the game host indicating game rules selection. At step 307, the transactional bot server 140 determines an input indicating new rules. The transactional bot server 140 receives input from the game host, the input specifies a maximum number of players (step 307), a total number of rewards (step 308), and payout amounts (step 309). At step 310, the transactional bot server 140 receives the inputs from step 307-309 to create a new rule available for selection at step 311. Alternatively at step 306, the transactional bot server 140 determines an input indicating existing game rules, At step 311 the transactional bot server 140 detects a game rule selection from the game host.

Figure 4:
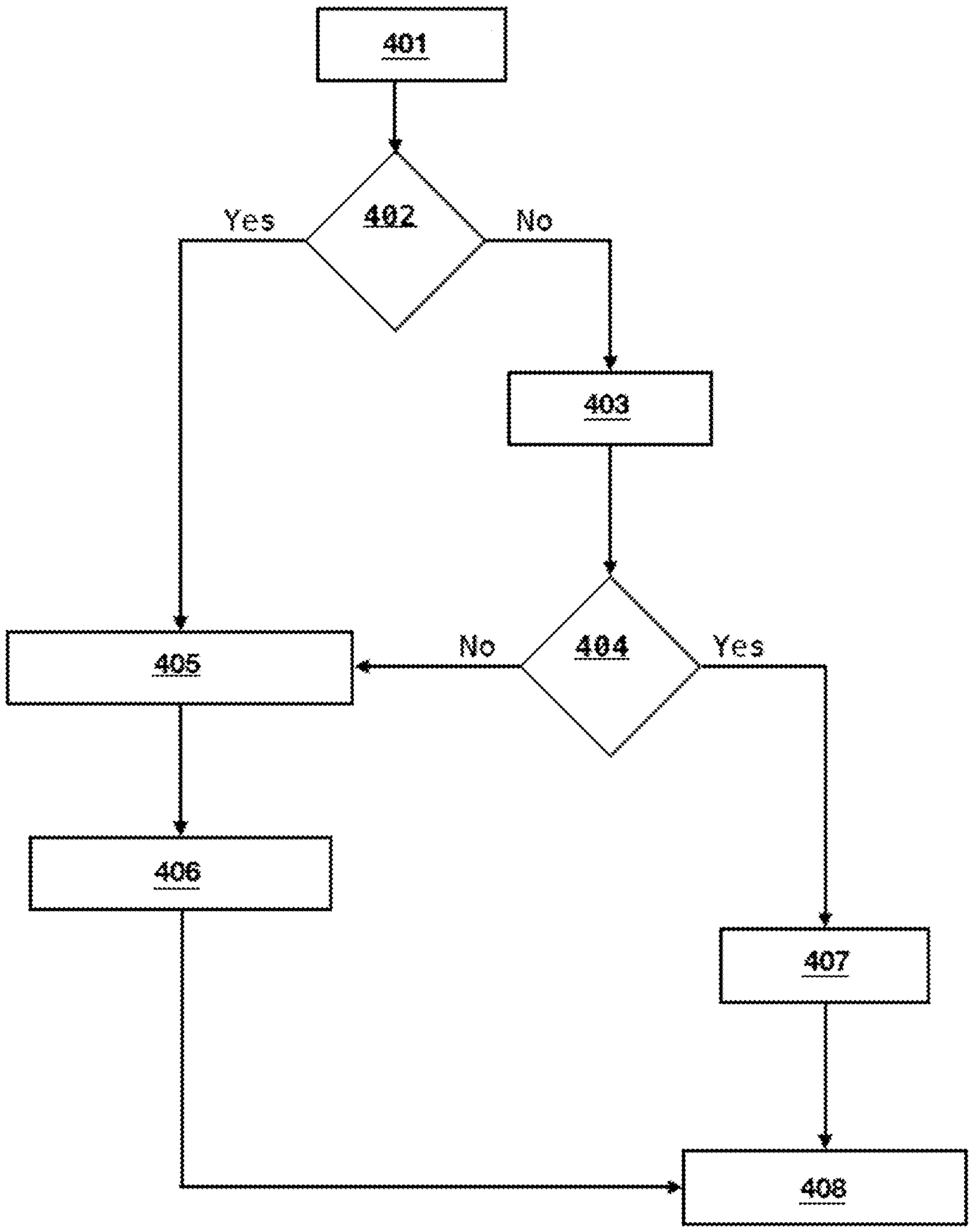
FIG. 4 is a flow chart illustrating a method of payout, according to an exemplary embodiment of the present disclosure.

Referring to FIG. 4, the method of payout may include step 401 of determining an input from the game host to kickstart a game. At step 402, the transactional bot server 140 detects cheating behaviors from players while the game is in progress. At step 403, the transactional bot server 140 does not detect any cheating behaviors, and detects uploading of game results from the game host. At step 404, the transactional bot server 140 detects the status of the upload. At step 407, the transactional bot server 140 determines the upload is complete, and issues the payout according to the game rules. At step 405, upon determining either cheating behaviors or an incomplete upload of game results, the transactional bot server 140 process refunds to players. The transactional bot server 140 makes a record of the incident and the players involved at step 406, and a record of the game result at step 408.

In various embodiments, the game host can launch its own video stream and invite guests to join the stream. The video stream may be structured as a conference video call (i.e., a community call) among the invited guests that allows the game host and guests to communicate with each other, including communicating about current sporting events in various scenarios. Through this ability to communicate directly with other users in real time, the host can organize gaming tournaments or fantasy leagues for the guests. Individuals who want to show their appreciation may do so by paying a game host.

Players have an ability to challenge each other via formal request within the system network. These formal requests may be referred to as a “challenge option.” The “challenge option” may present potential competitors with a digital notification disclosing an open challenge to and from another registered competitor. Competitions are won or lost based on desired “form of competition” (or parameters required to win). Different forms of competition include but are not limited to: acquiring the most points, acquiring the most kills, completing competition with a best time, acquiring the most assists, completing challenges with the least deaths, completing game objective first, completing challenges with the best statistical ratio, accumulating the largest combo, and winning or losing a competition/contest.

If the challenged competitor accepts the challenge, the challenge option may prompt the competitors to schedule a date and time for the competition. Once the challenge option is accepted, an invitation may be sent to registered players within the system network via an update center, as well as to spectators to follow either or both competitors. The invitation may also display calculated competitor statistics, winning odds (calculated based on competitor statistics), and time of the competition. Forms of competition may include, but are not limited to the following types of competitions:

- One VS. One Competition—One competitor competes against another competitor in a digital contest. Each competitor may play against another competitor. Odds of winning may be determined by data calculated based on captured images by image capture system.
- One VS. Multiple—One competitor competes against a plurality of competitors (i.e., multiple competitors) in a digital contest or competition. Players may play against either the one competitor, or the plurality of competitors. The odds of winning are determined by data calculated based on captured images by image capture software, however the prize for winning the single competitor may be multiplied by the number of competitors. Players winning the plurality of competitors receive a prize based on the odds divided by the number of winners.
- Multiple VS. Multiple—Multiple competitors compete against multiple competitors in a digital competition and or contest. The winning team receives a combined payout divided by the number of Competitors on the winning team. Winning teams are rewarded in the same capacity as "ONE vs ONE" competitions.
- Free For All—Competitors compete against multitude of Competitors, in a non-cooperative competition/contest. Each of the competitors may play against competitors doing the same. Players can play against any competitor to win.

Figure 5:
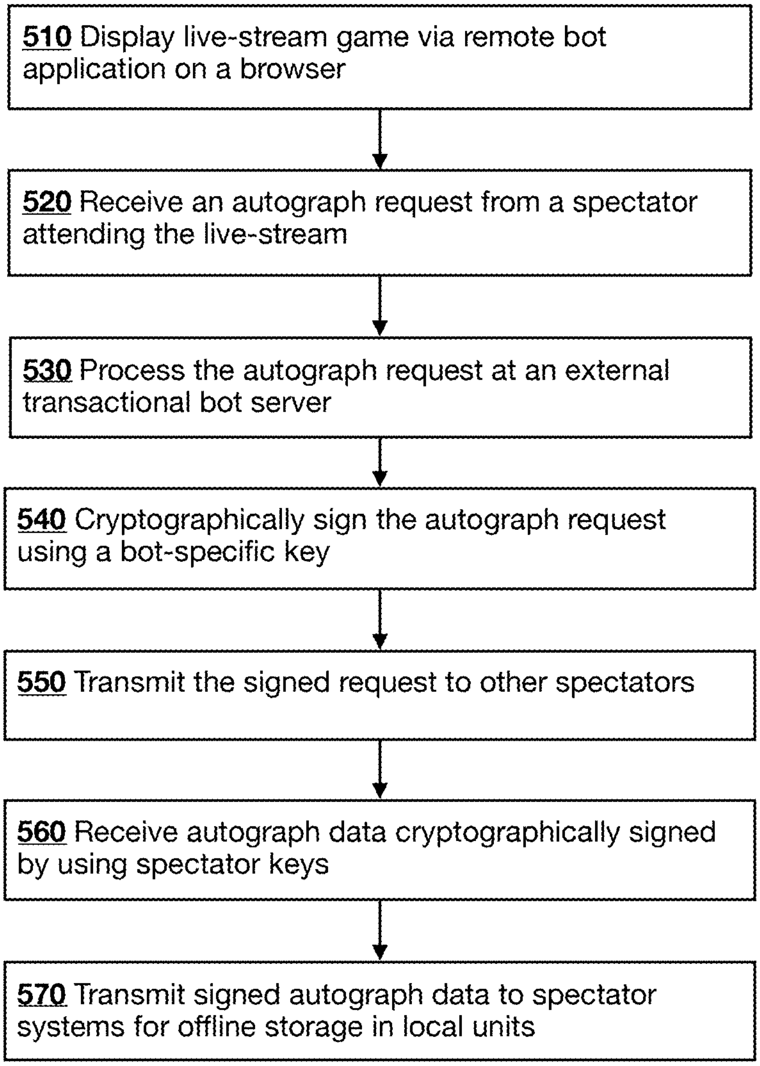
FIG. 5 is a flow chart illustrating a method of autographing a live-stream, according to an exemplary embodiment of the present disclosure.

Referring to FIG. 5, the method of autographing a live-stream may include a step 510 of displaying, on a browser 721 of a spectator system 130, a remote bot application 731 including a live-streaming online video game played by a plurality of players on the game server 120. At step 520, the remote bot application 731 receives input, via an AR computing unit 711 of the spectator system 130, from a spectator requesting an autograph from at least one of the plurality of other spectators attending the live-streaming online video game. At step 530, the input is transmitted via the remote bot application 731 from the spectator system 130 to an external transactional bot server 140 for processing. At step 540, the input is processed within a central processing unit of the external transactional bot server 140 to comprise an attendance data cryptographically signed by using a bot-specific key. At step 550, the remote bot application 731 transmits the processed input to the spectator systems of the plurality of other spectators, wherein the processed input is processed within the spectator system of the plurality of other spectators to result in autograph data by cryptographically signing the first attendance data using a spectator key. At step 560, the bot application 731 receives the autograph data from the plurality of other spectators in the external transactional bot server 140 and stores the autograph data in an escrow account associated with the external transactional bot server 140. At step 570, the spectator system 130 receives an output via the remote bot application 731 from the transactional bot server 140 including the original input and at least a portion of the autograph data in response to the at least one of the plurality of other spectators providing autograph data cryptographically signed by both the bot application and the plurality of other spectators, wherein the input is stored in an offline storage unit of the spectator system 130.

Figure 6:
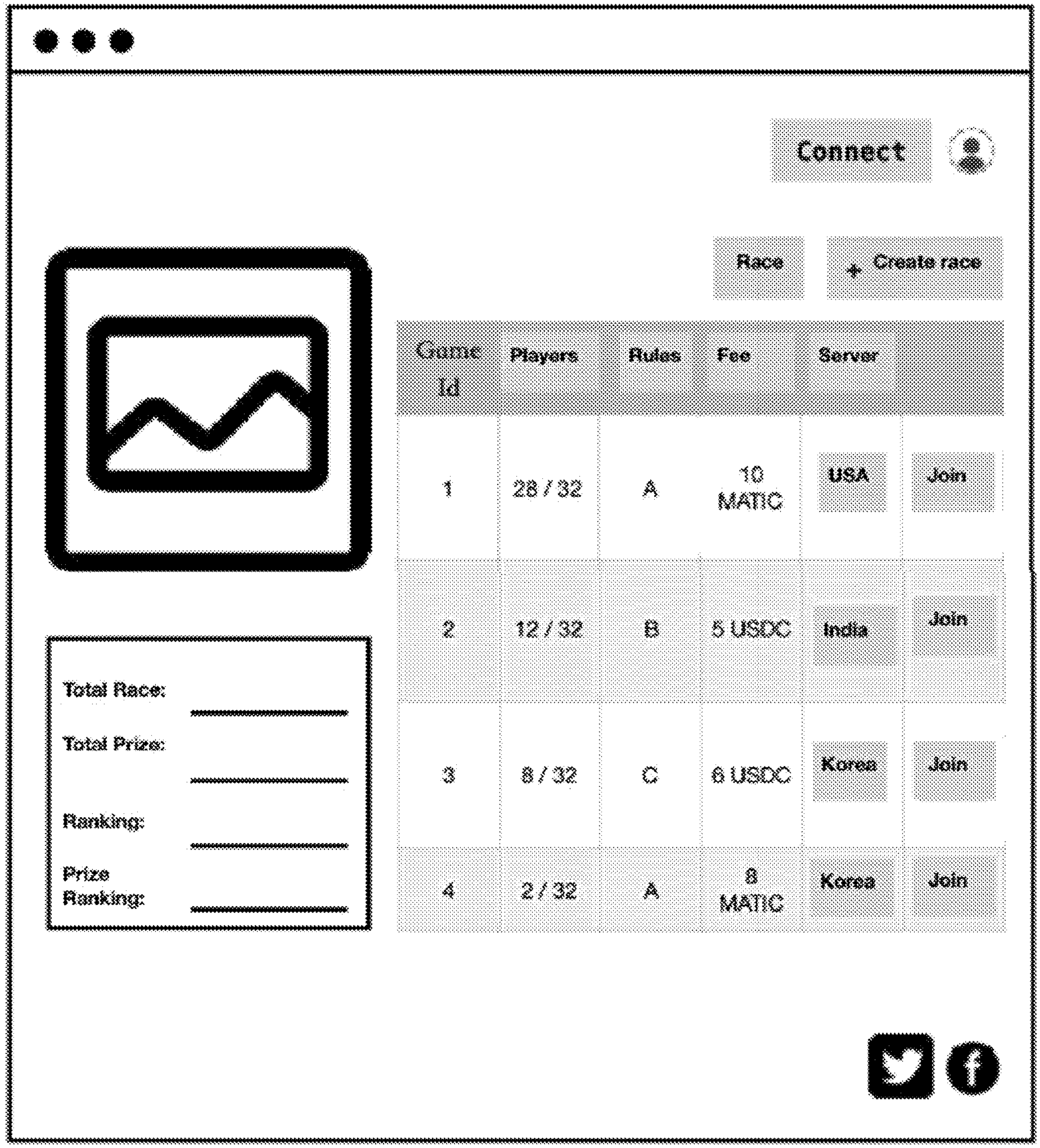
FIG. 6 illustrates an interface of the application showing a live-stream according to another embodiment of the present disclosure.

FIG. 6 illustrates an interface of the application showing a live-stream according to another embodiment of the present disclosure.

Figure 7:
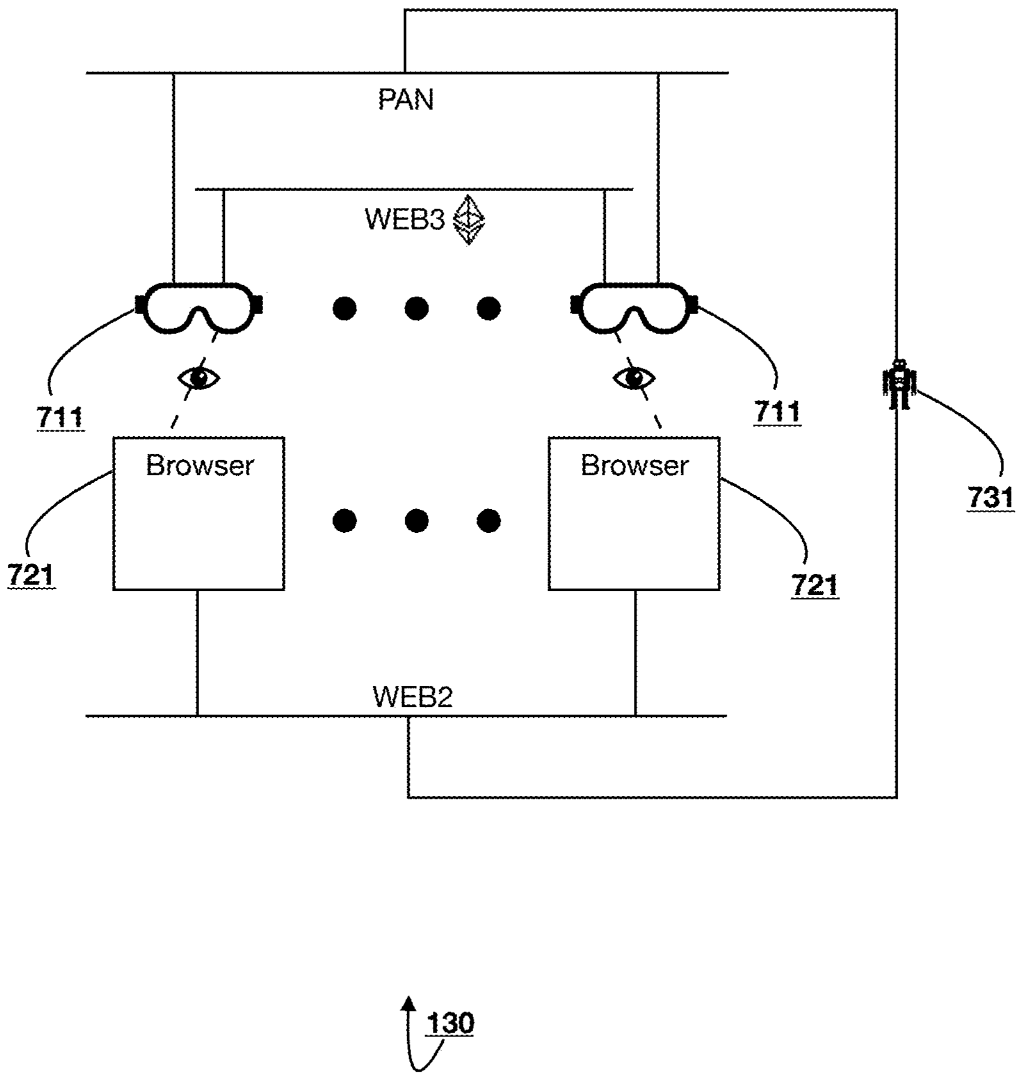
FIG. 7 illustrates a block diagram illustrating a Personal Area Network (PAN) for the metaverse live-streaming system, according to an exemplary embodiment of the present disclosure.

Referring to FIG. 7, the spectator system 130 may include a Personal Area Network (PAN) system, a plurality of web browsers 721, a remote bot application 731, and a plurality of wearable on-body AR computing units 711. Each of the plurality of AR computing units 711 may communicate with the bot application 731 over Personal Area Networks\(PAN). The Personal Area Network (PAN) may be any stable communications network, such as, for example, the Internet. Each of the plurality of web browsers 721 may communicate with game server 121 over any stable communications network, such as, for example, the Internet. Further, the plurality of web browsers 721 may communicate with the transactional bot server 140 via the game server 121 to display a graphical representation of the bot application 731 in order to support optical data exchange between AR computing units 711 and the bot application 731. The plurality of AR computing units 711 may include a first AR computing unit $\mathbf{711}_1$, a second AR computing unit $\mathbf{711}_2$, . . . , and an nth AR computing unit $\mathbf{711}_n$. There is no limit as to how many AR computing units 711 are included in the spectator system 130. The plurality of web browsers 721 may include a first web browser $\mathbf{721}_1$, a second web browser $\mathbf{721}_2$, . . . , and an nth web browser $\mathbf{721}_n$. There is no limit as to how many web browsers 721 are included in the spectator system 130.

AR computing units 711 are configured to reject incoming HTTP network traffic from web browsers 721 in order to safeguard WEB3 value network from threats originating from WEB2 information network. Advantagrousy instead, AR computing units 711 interact with web browsers 721 by optical data exfiltration over the air-gap. A remote bot application 731 may initiate contact via displaying a barcode 808 on web browsers 721. In response, an AR computing unit 711 may retrieve the displayed barcode 808 via optical data exfiltration to subsequently establish connection with the bot application 731 over the personal area network.

Figure 8:
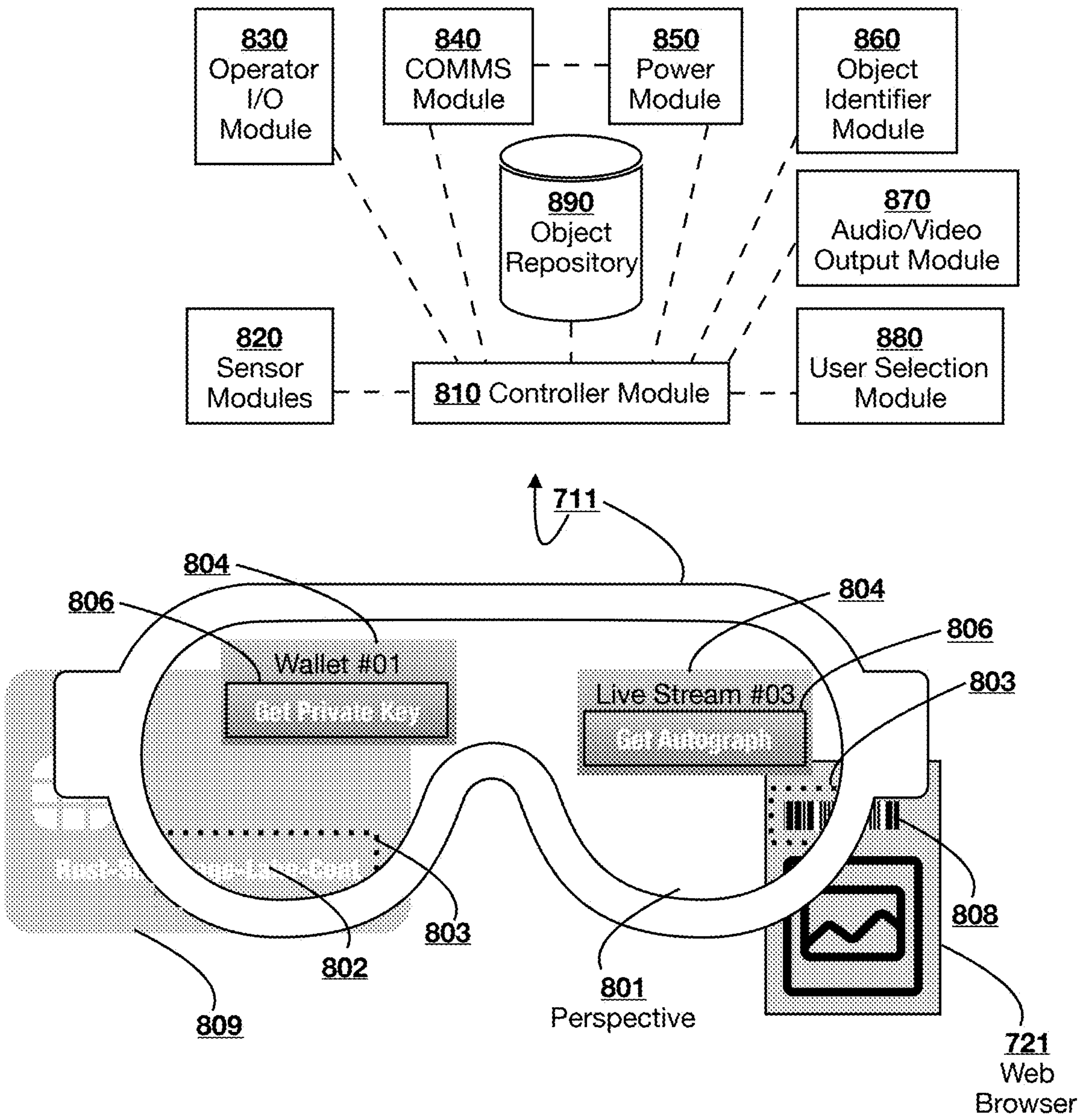
FIG. 8 illustrates an example application of a wearable on-body AR computing unit according to an example embodiment.

FIG. 8 illustrates an example application of a wearable on-body AR computing unit 711 according to an example embodiment having perspective interfaces 801 which can be used to facilitate WEB3 transactions in an augmented reality. The AR computing unit 711 includes various components. Although additional components are contemplated, the example AR computing unit 711 for simplicity includes nine components: a controller module 810 to serve as a controller for the AR commuting unit 711, sensor modules 820 to serve as sensors/inputs, operator input/output devices 830*t*, a power module 850 to serve as system power, an object identifier module 860, an audio/video output module 870, a user selection module 880, and an object repository 890. Multiple modules can exist in a single device, or can exist as separate devices. The architecture consists of individual devices or "modules" that interact with each other to provide spectators with the capabilities they need to execute their operations. These exemplary illustrated modules, issued to the spectators, create and interact via a "Personal Area Network" (PAN) for each spectator. The entire on-body system further communicates over a Wide Area Network (WAN) to the bot application 731 of the external transactional bot server 140.

The Controller Module 810 can be self-contained by including its own power supply independent of a separate power module 850, and to have the following internal capabilities: Power source (e.g., to supply sufficient power to last a 12-hour shift), PAN communications (e.g., Bluetooth, Wi-Fi, USB), WAN communications [e.g., Wi-Fi, Long Term Evolution (LTE)], Audio/video recording, and Data storage. The Controller Module 810 also can have the following capabilities built in, or they could be provided as external modules/devices: Display, Manual input (keyboard/touchscreen), Built-in speaker/microphone, Camera, Geolocation sensor [Global Positioning System (GPS)], Haptic displays/sensors, Kinesthetic displays/sensors, Vestibular data collection capability, and WAN communications (e.g., LTE).

With the embodiments disclosed herein, for example, when the user is doing "live-streaming," that is, when the user is looking at a remote bot application 731 displayed in a web browser 721, and when the user is near a physical passphrase badge 809, the user can utilize the AR computing unit 711 to access information 804, regarding an identified/detected/recognized objects of interest. The objects of interest can be selected using select areas 803 in ways that are discussed herein. Then, the user can select to perform actions 806 (including transactions) to the objects of interest in ways that are discussed herein. Thus, for example, through the perspective interface 801 in the augmented reality environment, the user can get network endpoint of, connect via personal area network to, or send autograph request to the selected remote bot application 731 displayed in the web browser 721. The objects can be identified by ways discussed herein including, for example, a barcode 808 attached to the display of remote bot application 731 in the web browser 721. Written materials for identifying physical passphrase badge 809 and/or other relevant information, such as passphrase and private key information 802, can also be recognized/detected by the AR computing unit 711.

In some embodiments, objects of interest can be identified/recognized/detected using the various physical and/or other characteristics of the objects, and information relevant to transactions of the objects can be presented/displayed/projected in the augmented reality environment so as to enable the user to conduct such transactions. Characteristics and attributes of objects of interest that help the identification/recognition/detection can include what can be perceived by users in the augmented reality via AR computing unit 711. For example, they can include name, alias, attributes, shape, size, dimension, or other physical characteristics or recognition patterns or augmented reality markers. They can also include other identification information that can be detected by the AR computing unit 711, such as vendor(s) name, SKU code, QR code, I-dimensional or 2-dimensional or multidimensional barcode 808, RFID code.

According to the embodiments disclosed herein, the AR computing unit 711 can facilitate WEB3 transactions of an object of interest (e.g., a physical passphrase badge 809, a remote bot application 731) via an augmented reality environment provided by the AR computing unit 711. The AR computing unit 711 can detect the presence of the object when the object is seen/viewed/looked at by the user or in the vicinity of the user. In some embodiments, the AR computing unit 711 automatically identifies the object from the perspective 801 of a user. The perspective 801 can be captured or sensed by the AR computing unit 711 via, for example, a camera or an image sensor. One embodiment of the AR computing unit 711 includes a camera or an image sensor 820. The image sensor 820 can be any combination of software agents and/or hardware modules able to record or capture still images such as photographs or moving images such as video clips or movies.

According to some additional or alternative embodiments, the AR computing unit 711, in providing the augmented reality environment, can enable the user to select an object of interest that is in the augmented reality. The AR computing unit 711 can detect one or more targets in the augmented reality platform using a select area 825 from the perspective 801 of a user. After the targets are detected, the AR computing unit 711 prompts the user to choose an object of interest from the one or more detected targets.

In some embodiments, the presence of the object is detected or identified in the augmented reality environment by a shape or other physical characteristics for presentation via the AR computing unit 711 to facilitate transactions. For example, the object can have a unique combination of shape, size, color, or other physical dimension or characteristics as registered in the object repository 890, so that the object identifier module 860 can recognize it. Such shape or physical characteristics can be detected from, for example, the image sensor 820. As previously mentioned, the entries in the repository 890 can also include recognition patterns or photos or videos or metadata that may help identifying the object.

In some embodiments, the presence of the object is detected or identified in the augmented reality environment by one or more of: (i) a visual marker; (ii) a marker or tag; (iii) a one-dimensional barcode 808; or (iv) a multi-dimensional barcode 808, on the object. For example, a marker on the object such as a QR code or other augmented reality marker can be presented for identification or detection via the image sensor 820. In another example, a barcode 808 representing a network endpoint URL may be present. The barcode 808 can be one-dimensional or multidimensional.

After targets are recognized, they can then be selected by the user for actions or interactions. The AR computing unit 711 can receive the user's choice of the object of interest by detecting movement and selection by a selection tool or a pointer, or movement and selection represented by a gesture via the motion/gesture sensor 820, user stimulus sensor 820, and/or hand/finger/other gestures captured by the image sensor 820.

More specifically, in detecting the user's gesture to move a pointer or targeting or selection tool, and/or to select an object, the AR computing unit 711 can perform capturing, via its various sensors, the gesture from one or more of: (i) movements or non-movements of an eye of the user, (ii) locations of a focal point of an eye of the user, or (iii) movements of an eye lid of the user. Additionally, the AR computing unit 711 can capture the gesture from one or more of: (i) movements of hand or finger as recognized by a camera of the AR computing unit 711, (ii) movements of a virtual pointer controlled by a wireless peripheral device, (iv) movements of a virtual pointer controlled by a touch-sensitive display of the AR computing unit 711, (v) movements of the AR computing unit 711 itself, or (vi) movements of the user's head, limbs, or torso. The capturing can be further based on a speed or velocity of the movements. The present embodiments can capture or identify gestures from, for example, winking of the user and/or an eye focus or eye foci of the user. Another example of gesture controlling can include eyeball motion tracking and/or eye focal point tracking. In this way, the user of AR computing unit 711 may operate various selection mechanisms, for example, using his or her eyes or by moving his or her hands/arms/fingers in the perspective 801 to make specific gestures such as pointing or tracing the outline of some object, or by operating a virtual pointer in the scene using a handheld peripheral such as a wireless pointing device or a mouse equivalent, or by touching a touch-sensitive display and gesturing on it to indicate actions and selections, or by moving the AR computing unit 711 itself with specific gestures and velocities to use the AR computing unit 711 as a pointer or selection tool.

Figure 9:
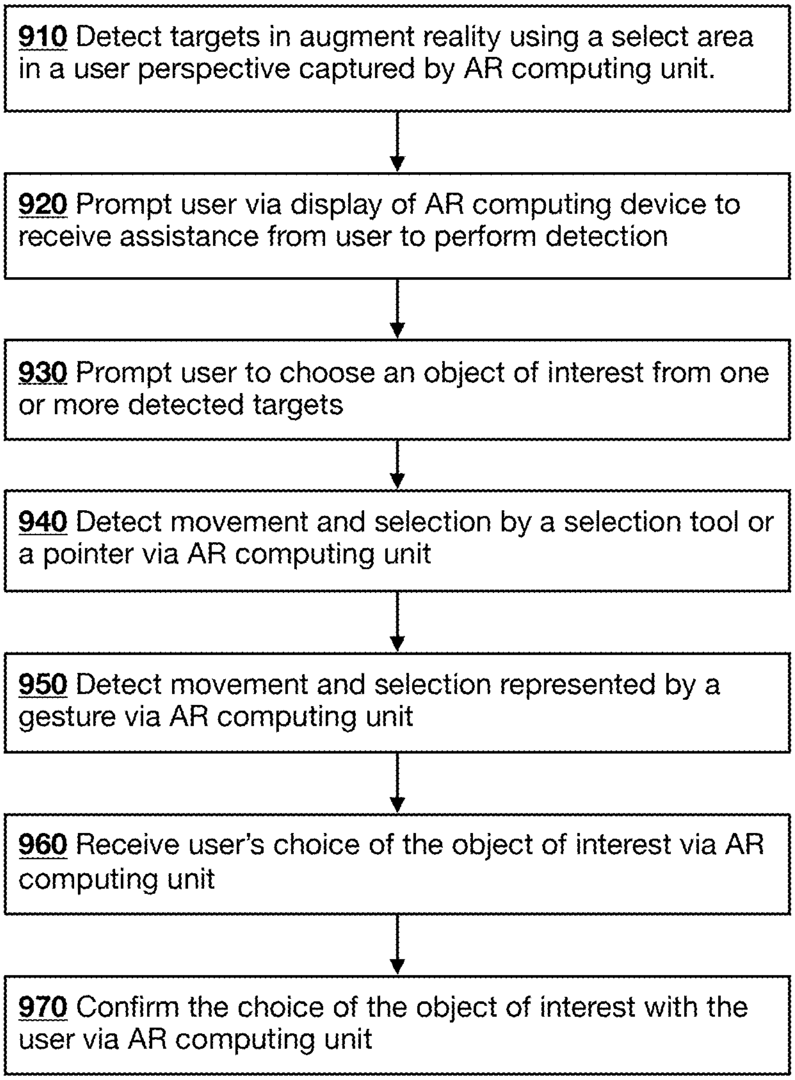
FIG. 9 is a flow chart illustrating a method of selecting/identifying an object of interest in an augmented reality environment.

Referring to FIG. 9, the method of selecting/identifying an object of interest in an augmented reality environment may include step 910 of detecting, on AR computing unit 711, one or more targets in an augmented reality using a select area 803 in a perspective 801 of a user. The perspective 801 is captured by the AR computing unit 711 (e.g., via image sensor 820, FIG. 8). In accordance with some embodiments, the AR computing unit 711 prompts (920), via audio/video output module 870, the user to enter a learning mode in which the AR computing unit 711 receives an assistance from the user to perform the detection.

After detecting the targets, the AR computing unit 711 prompts (930) the user to choose an object of interest from the one or more detected targets. Then, AR computing unit 711 receives (960) the user's choice of the object of interest (e.g., via motion/gesture sensor 820, user stimulus sensor 820, and/or other gestures captured by image sensor 820, as determined by the user selection module 880, FIG. 8). The AR computing unit 711 can detect (940) movement and selection by a selection tool or a pointer, and/or movement and selection represented by a gesture (950). Additionally, the AR computing unit 711 can confirm (970) with the user of the choice of the object of interest.

One way to prove ownership of an autograph data is to cryptographically sign autograph data off-chain by using cryptographic keys made available to a player via a crypto wallet. Autograph data can either be a collection of text messages or hashes, along with public keys and owner information. Remote bot applications 731 may use a wallet address and signed autograph data for verification on-chain. Remote bot applications 731 may also use a bot-specific key to cryptographically sign an autograph data comprising the bot's public key, proof of ownership, and live-stream information for spectator systems 130 for verification, wherein the proof of ownership comprises a public key fingerprint. In some embodiments, the proof of ownership comprises a confirmation code derived from the passphrase.

In some embodiments, a public key fingerprint is used for verification, Advantageously, this is a decentralized approach as the public key infrastructure does not depend on a central key certifying authority or game companies. A public key fingerprint is a string of letters and numbers representing a public key. The fingerprint is created by a cryptographic hash function, which condenses the public key down to a string which is shorter and more manageable. The remote bot application 731 and spectator systems 130 exchange these fingerprints as they verify each other's identification, obtain the public keys corresponding to the fingerprints they receive and digitally sign them.

Bots have their own keys and sigchain for the purpose of end-to-end device and attendance management. A bot can be restricted to read only messages directed at it. This allows adding bots to a live-stream without exposing spectator's messages to whoever's hosting the bot. Even a hosted bot lacks the keys to read other messages directed to a spectator system 130. When a live-stream admin invites a bot into a channel, they announce a bot-specific key in the live-stream's sigchain. When multiple bots are installed in one live-stream, they get independently derived keys to keep them from reading each other's messages.

Only messages intended for the bot are encrypted for the bot. All other messages aren't encrypted using the key, so the bot can't read them. It can tell those messages are happening, and who is sending them, but it cannot understand them. Only a live-stream admin can add a new spectator to a live-stream. Accepting a new spectator is a cryptographically-signed statement. If it's a restricted bot, the addition statement says so. Team changes are appended to an auditable, growing chain for the team.

The remote bot applications 731 and the wearable on-body AR computing units 711 share a symmetric per-team key, which is a random 32-byte key that all spectators of the live-stream can see. This key rotates whenever anyone in the live-stream revokes a device. All data in a chat channel is symmetrically encrypted using this key. When a live-stream admin invites a bot into a channel, a bot-specific key is derived from the shared key (via HMAC-based key derivation), and encrypts this derived key for the bot's public key. All messages to and from the bot are encrypted using this derived key. Spectators in the conversation will only encrypt messages that begin with bot-specific prefixes for the derived key. All human readers can derive this key from the shared team key, and therefore can decrypt the bot's outputs.

A passphrase badge is given to a user upon registering into a live-stream event. The badge serves as a pass into the event. Badges can be pretty elaborate little electronic devices, devices that include little blinking lights, LCD screens, and even built-in microphones. There are also non-electronic badges. There are also badges that were simply a solid metal, non-electronic. In some cases, a badge may have some kind of puzzle or clues written on it, which may be a key to unlock a hidden message or a launch key for access to some secret web pages.

In certain embodiments, a spectator system 130 further comprises a secure encrypted backup system and method for encrypting and encoding a passphrase-protected private key record in the form of an encoded printable string. Encrypted private key records are intended for use on physical passphrase badges. Each record string contains all the information needed to reconstitute the private key except for a passphrase.

In certain embodiments, user of a wearable on-body AR computing unit 711 who knows the passphrase and who is the intended beneficiary of the private keys is the owner, who will generate a wallet address and an encrypted private key himself, and in turn give the wallet address and encrypted private key to the associates. The AR computing unit 711 advises an owner who has requested multiple private keys to be generated to ensure that each private key has a sequence number. The party generating the wallet address has the option to return a confirmation code which allows the owner to independently verify that a given wallet address actually depends on the passphrase. If a wallet address given to the owner can be successfully regenerated through the confirmation process, the owner can be reasonably assured that any spending without the passphrase is infeasible.

A hash of the resulting wallet address is encoded in plaintext within each encrypted key, so it can be correlated to a wallet address with reasonable probability by someone not knowing the passphrase. The complete wallet address can be derived through successful decryption of the key record. The AR computing unit 711 may choose a passphrase of their choice whose minimum length and required format does not preclude the spectator from memorizing it or engraving it on a physical passphrase badge 809. The passphrase may be much shorter than the length of a typical private key, short enough that a label or engraver can be used to permanently commit a passphrase to a physical passphrase badge 809. The AR computing unit 711 also has the ability to generate a large number of addresses protected by the same password, while enjoying a high degree of security.

In certain embodiments, the AR computing unit 711 supports encrypting a private key by offering the ability for encrypting any known private key, wherein the party performing the encryption must know the passphrase. Only the person who knows the original passphrase can decrypt the private key.

In certain embodiments, given a passphrase and given a confirmation code, the method can recalculate the wallet address, verify the address hash, and then assert that the wallet address actually depends on this passphrase.

Password and passphrase-protected private keys enable sending private access from person to person. Someone wanting to send private access through postal mail could send a password-protected badge and give the recipient the passphrase over the phone or email, making the transfer safe from interception of either channel. A user of passphrase badges could carry encrypted private keys while leaving a copy at home as an element of protection against accidental loss or theft. A user of passphrase badges could keep the passphrase in a bank vault or safety deposit box, and at the same time share the passphrase with trusted associates as protection against someone gaining access to the passphrase badges.

Figure 10:
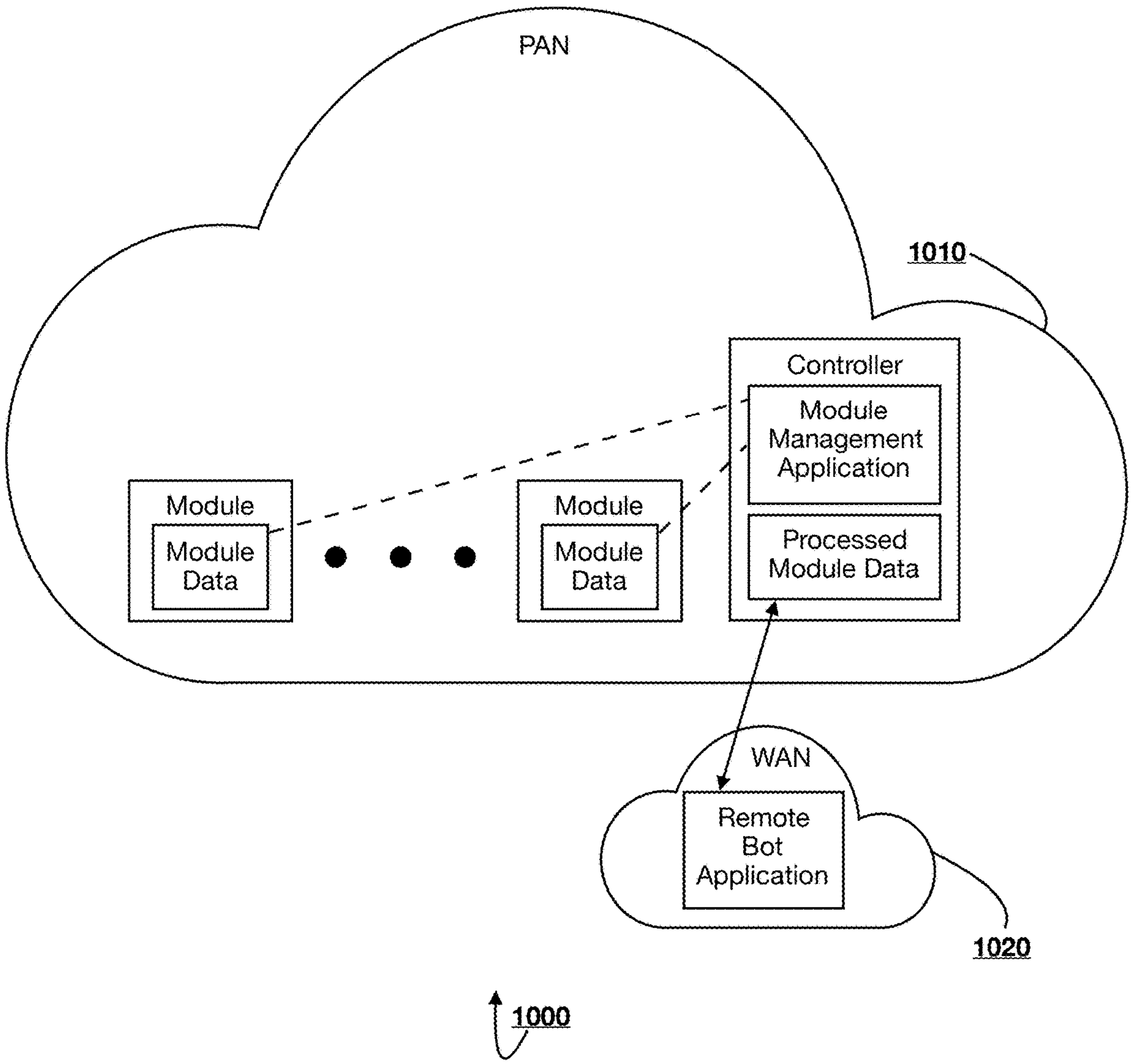
FIG. 10 illustrates a spectator system according to an example embodiment.

FIG. 10 illustrates an example system 1000 including communication between a PAN 1010 and a WAN 1020. The PAN 1010 is formed by communication capabilities between various modules and the controller. For example, the module management application operated by the controller can establish communications with the modules to exchange module data. The controller can then analyze the module data and provide processed module data. The processed module data can be passed to a remote bot application 731 in the WAN 1020 via WAN communications capabilities supported by the controller and the remote bot application 731.

Figure 11:
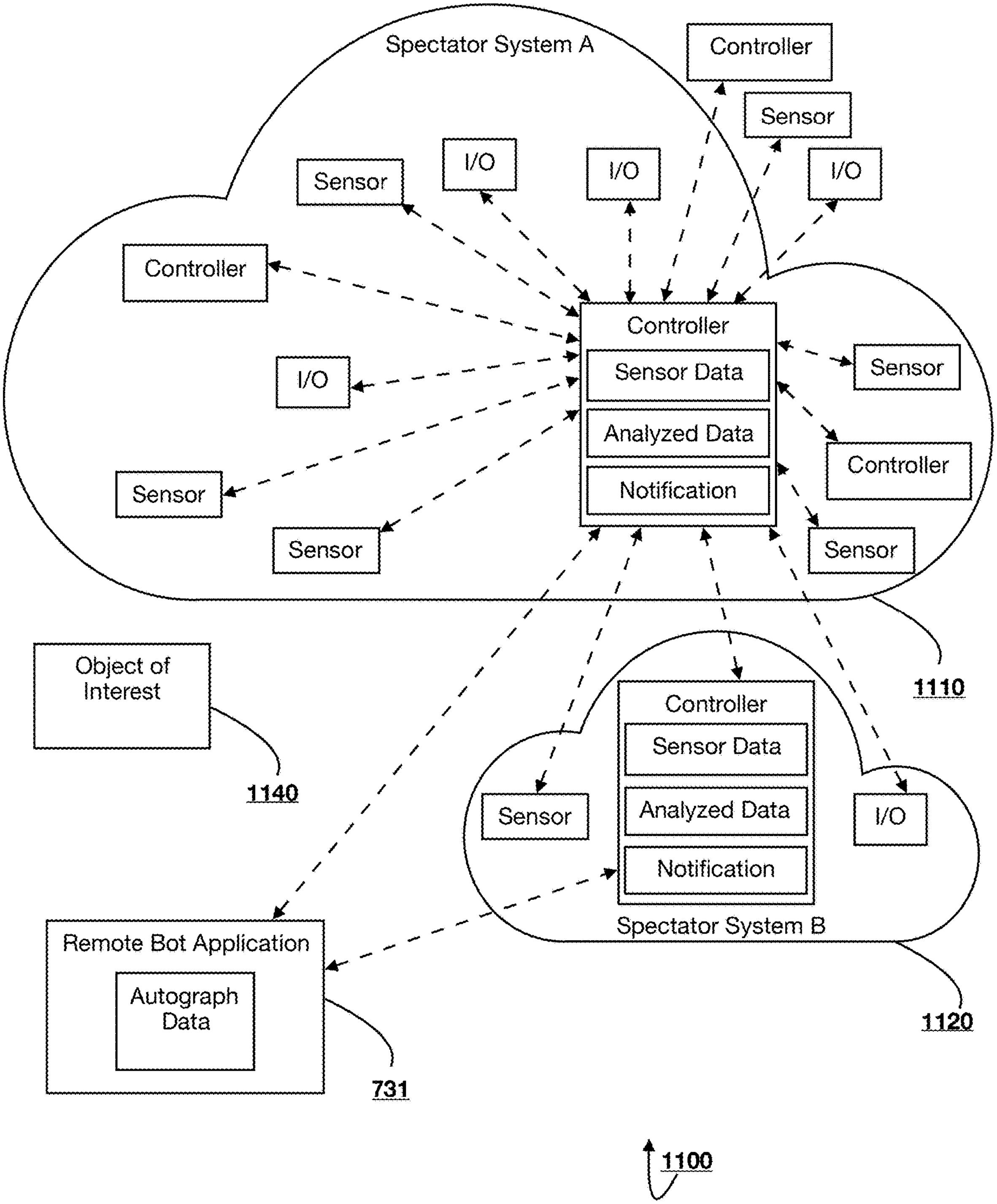
FIG. 11 illustrates a spectator system according to an example embodiment.

FIG. 11 illustrates an example system 1100 including a plurality of systems (spectator system A 1110, spectator system B 1120, remote bot application 731) and an object 1140, e.g., a wallet address derived from a passphrase 802 (FIG. 8). The controller of a given system can establish communications with its associated sensors, I/Os, controllers etc. (e.g., forming part of its PAN), but also with other systems, controllers, sensors, etc. (e.g., those that do not form part of that controller's PAN). Accordingly, it's possible for spectator system A 1110 to indirectly detect the object 1140, e.g., via reading the information from those sensors/controllers/systems that are within sensing proximity to the object 1140. For example, the spectator system B can sense object 1140, communicate information back to the remote bot application 731, which can then relay the information of sensed object 1140 to the spectator system A 1110.

Figure 12:
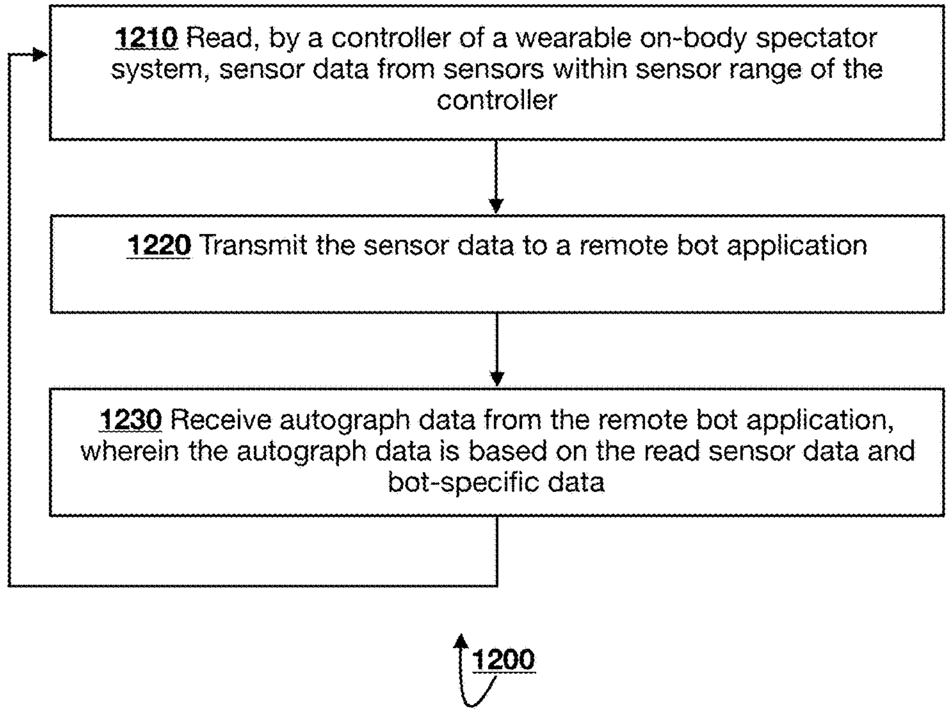
FIG. 12 illustrates a spectator system according to an example embodiment.

FIG. 12 illustrates an example method 1200 of receiving autograph data by a spectator system according to an example embodiment. Flow begins at block 1210, where a controller of a spectator system 130 reads sensor data from sensors within sensor range of the controller. For example, the controller can read notifications/information/data from sensors, modules, and other components forming a personal area network (PAN) with the controller, as well as from other components not directly joined to the controller's PAN. In block 1220, the sensor data is transmitted to a remote bot application 731. For example, the controller responds to a request from another controller, e.g., a controller of another spectator, via a wide area network (WAN) communications connection. In another example, the controller transmits analyzed/processed sensor information to a central command system on transactional bot server 140, which can incorporate such received information into the formation of autograph data. In block 1230, autograph data is received from the remote bot application 731, wherein the autograph data is based on the read sensor data and bot-specific data. For example, the remote bot application 731 cross-references bot-specific information corresponding to the sensor data (e.g., identification information corresponding to a platform user database) via the Internet, and combines a sensor data reading of event information, thereby generating autograph data that notifies the spectator of an incoming autograph request.

The invention claimed is:

1. A metaverse live-streaming system, comprising:

a plurality of gaming systems to allow a plurality of players to play an online video game thereon;

a game server to provide, to the plurality of gaming systems, data required to access, operate and play the online video game on the plurality of gaming systems;

a plurality of spectator systems to allow a plurality of third party spectators to watch the online video game as it is played by the plurality of players in real time, wherein each of the plurality of spectator systems comprising:

- a web browser to display the remote bot application including a live-stream of the online video game played by the plurality of players on the game server;
- a transactional bot server running a remote bot application thereon, the transactional bot server comprising a central processing unit (CPU) to process the running remote bot application;
- a transmitter to transmit original input via the remote bot application to an transactional bot server to store in an escrow account, wherein the original input comprises autograph data signed by using a bot-specific key;
- a receiver to receive an output via the remote bot application from the transactional bot server including the original input and at least a portion of the autograph data cryptographically signed in response to the original input; and
- an AR computing unit to
  - detect presence of the remote bot application when the web browser is viewed by or in vicinity of a third party spectator,
  - automatically identify the remote bot application from a perspective of the third party spectator,
  - communicably connect to the remote bot application via a personal area network to obtain the autograph data for cryptographically signing, and
  - reject HTTP network traffic incoming from the web browser: and a transactional bot server to communicate with the plurality of spectator systems to allow the plurality of third party spectators to view at least one of the plurality of players playing the online video game.

2. The system of claim 1, wherein the AR computing unit further comprises:

at least one sensor configured to identify sensor information;
a touch-sensitive display;
a camera; and
a controller configured to:
establish the personal area network to interface with the at least one sensor,
display an image, in the perspective of the third party spectator being captured by at least one of the camera and the at least one sensor, for the detection of presence of the remote bot application in the image,
obtain identifying information associated with the detected remote bot application present in the image,
determine a connection endpoint from the identifying information for the AR computing unit to communicably connect to the remote bot application,
detect presence of one or more physical passphrase badges in the image,
obtain one or more passphrases associated with the one or more physical passphrase badges present in the image,
enter a mode in which the AR computing unit receives an assistance from a user to select a target,
in response to selecting the target, derive a pair of wallet address and private spectator key based on the passphrase associated with the selected target, and
based on autograph data corresponding to the output received via the remote bot application from the transactional bot server, cryptographically signed at least a portion of the autograph data by using the private spectator key.

3. The system of claim 2, wherein the controller is configured to analyze and process the sensor information of the at least one sensor to provide formation of the autograph data.

4. The system of claim 2, wherein the controller is configured to:
display a selection tool in the image to form a select area,
provide, via the touch-sensitive display, the spectator with the selection tool in a perspective to form the select area, and
receive a user input for the selecting of target corresponding to the select area by using the selection tool.

5. The system of claim 3, wherein the autograph data further comprises a confirmation code, the confirmation code further comprises a plurality of encoded strings for computing an address hash by using the passphrase with the plurality of encoded strings.

6. The system of claim 5, wherein the controller is configured to derive the confirmation code from the passphrase.

7. The system of claim 3, wherein the autograph data further comprises a public key fingerprint created by a cryptographic hash function, wherein the public key fingerprint comprises a string of letters and numbers representing a public key derived from the passphrase.

8. The system of claim 5, wherein the controller is configured to, based on the derived wallet address, verify the address hash, to assert that the address hash actually depends on the passphrase.

9. The system of claim 1, wherein each of the plurality of gaming systems further comprises:
a display unit to display images related to the online video game thereon;
a game console to allow at least one of the plurality of players to play the online video game;
a computing device to allow the at least one of the plurality of players to access at least one of a website, an application, the game server, and the transactional bot server, using credentials of the at least one of the plurality of players; and
a video capturing device to capture live game-play images corresponding to the online video game from the game console that are also displayed on the display unit, and to transmit these captured live game-play images to the computing device in real time.

10. The system of claim 9, wherein the computing device receives and authenticates credential information received from at least one of the plurality of players and the plurality of third party spectators to access the remote bot application by using the credentials.

* * * * *